(12) United States Patent
Wolf, II

(10) Patent No.: US 10,321,665 B2
(45) Date of Patent: *Jun. 18, 2019

(54) SYSTEM FOR CONTROLLED HEATING AND VENTILATION OF LIVESTOCK STRUCTURES

(71) Applicant: AgriEOSIP LLC, Jacksonville Beach, FL (US)

(72) Inventor: John C. Wolf, II, Jacksonville Beach, FL (US)

(73) Assignee: AgriEOSIP LLC, Jacksonville Beach, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/831,105

(22) Filed: Dec. 4, 2017

(65) Prior Publication Data

US 2018/0084761 A1    Mar. 29, 2018

Related U.S. Application Data

(63) Continuation of application No. 14/599,163, filed on Jan. 16, 2015, now Pat. No. 9,848,586.

(Continued)

(51) Int. Cl.
*A01K 1/00* (2006.01)
*F24F 5/00* (2006.01)
(Continued)

(52) U.S. Cl.
CPC ............ *A01K 31/20* (2013.01); *A01K 1/0047* (2013.01); *F24S 10/80* (2018.05); *F24S 50/40* (2018.05);
(Continued)

(58) Field of Classification Search
CPC ............... F24F 7/007; F24F 2005/0064; F24F 2011/0002; A01K 31/20; A01K 1/0047; F24J 2/0023; F24J 2/402; F24J 2/42
See application file for complete search history.

(56) References Cited

U.S. PATENT DOCUMENTS

| 3,783,829 A | * | 1/1974 | Siciliano | ................ A01K 31/17 |
| | | | | 119/455 |
| 4,272,268 A | * | 6/1981 | Greiner | ............... F24D 11/0264 |
| | | | | 62/235.1 |

(Continued)

*Primary Examiner* — Kun Kai Ma
(74) *Attorney, Agent, or Firm* — Brian Billett

(57) ABSTRACT

Disclosed is a system and method for controlling the environment of a broiler poultry structure interior utilizing a transpired solar collector and controllable vents, fans and sensors. In an embodiment, the incident angle of the transpired collector is adjusted to provide additional heat or shade as needed. In an embodiment of the system the Environmental Optimization System ("EOS") provides a system for the intelligent control and monitoring the broiler poultry livestock structure environment through the utilization of a variety of environmental and livestock behavior sensors, apparatus for controlling the thermal collection and existing interior heating/air conditioning/ventilation ("HVAC") systems, and Internet or cloud based intelligent control and monitoring capabilities of the system. In various embodiments central sensor data aggregation is utilized to provide improved optimization control for individual structures based on data from multiple structures.

18 Claims, 11 Drawing Sheets

Related U.S. Application Data

(60) Provisional application No. 61/927,991, filed on Jan. 16, 2014.

(51) Int. Cl.
    *A01K 31/20*     (2006.01)
    *F24F 11/00*     (2018.01)
    *F24S 10/80*     (2018.01)
    *F24S 50/40*     (2018.01)
    *F24S 90/00*     (2018.01)

(52) U.S. Cl.
    CPC ....... *F24S 90/00* (2018.05); *F24F 2005/0064* (2013.01); *F24F 2011/0002* (2013.01); *Y02A 30/272* (2018.01); *Y02A 40/76* (2018.01); *Y02B 10/20* (2013.01); *Y02B 10/24* (2013.01); *Y02E 10/44* (2013.01); *Y02P 60/521* (2015.11); *Y02P 60/542* (2015.11)

(56) References Cited

U.S. PATENT DOCUMENTS

| | | | | |
|---|---|---|---|---|
| 4,324,289 A * | 4/1982 | Lahti | F24D 11/007 | 165/48.2 |
| RE31,321 E * | 7/1983 | Harrison | F24S 50/40 | 126/585 |
| 4,949,704 A * | 8/1990 | Pfluger | F24S 50/40 | 126/594 |
| RE33,600 E * | 6/1991 | Timmons | A01K 1/0047 | 119/306 |
| 5,407,129 A * | 4/1995 | Carey | A01K 1/0047 | 236/91 E |
| 5,596,981 A * | 1/1997 | Soucy | E06B 3/6612 | 126/704 |
| 5,813,599 A * | 9/1998 | Hoff | A01K 1/0047 | 236/49.3 |
| 6,115,679 A * | 9/2000 | Rutter | A01K 29/005 | 119/421 |
| 6,666,681 B1 * | 12/2003 | Do | F24H 3/065 | 119/304 |
| 6,920,874 B1 * | 7/2005 | Siegel | F24C 15/2021 | 126/21 A |
| 7,677,243 B2 * | 3/2010 | McClendon | F24F 5/0046 | 126/621 |
| 2004/0196366 A1 * | 10/2004 | Thiel | H04N 7/183 | 348/143 |
| 2005/0153410 A1 * | 7/2005 | Hallberg | C12M 21/04 | 435/161 |
| 2008/0060635 A1 * | 3/2008 | Wilkinson | F24F 5/0075 | 126/633 |
| 2008/0201180 A1 * | 8/2008 | Green | G06Q 10/06 | 705/7.37 |
| 2009/0094097 A1 * | 4/2009 | Gardenswartz | G05B 15/02 | 705/7.22 |
| 2010/0206297 A1 * | 8/2010 | Wilkinson | F24J 2/20 | 126/628 |
| 2011/0061601 A1 * | 3/2011 | Correa | A01K 1/0029 | 119/437 |
| 2011/0120449 A1 * | 5/2011 | Ryan | F24S 10/505 | 126/628 |
| 2011/0139147 A1 * | 6/2011 | Grulke | F24S 20/66 | 126/634 |
| 2011/0146582 A1 * | 6/2011 | Lemmon | A01K 1/0047 | 119/448 |
| 2011/0253129 A1 * | 10/2011 | Daly | F24J 2/4607 | 126/701 |
| 2011/0259029 A1 * | 10/2011 | Burk | F25B 17/083 | 62/235.1 |
| 2012/0055414 A1 * | 3/2012 | Correa | A01K 1/0029 | 119/448 |
| 2014/0245886 A1 * | 9/2014 | Rosen | A61L 9/22 | 95/57 |
| 2015/0247652 A1 * | 9/2015 | Coulter | F24F 5/0046 | 126/632 |

* cited by examiner

SYSTEM FOR CONTROLLED HEATING AND VENTILATION OF LIVESTOCK STRUCTURES

RELATED APPLICATIONS

This application is a continuation of U.S. patent application Ser. No. 14/599,163 filed on Jan. 16, 2015, and claims the benefit of that application as well as U.S. provisional application 61/927,991 filed on Jan. 16, 2014. Both above named applications are incorporated herein in their entirety.

FIELD OF THE INVENTION

The present invention generally relates to the field of environmental control.

BACKGROUND

Animals and plants can tolerate only a limited range of environmental conditions. Depending on the species, the ideal range of environmental conditions may be very narrow, particularly during early development. Certain livestock, such as poultry, are commonly housed in a structure with controlled conditions in order to provide the optimal environment for productive and healthy growth. A critical factor for determining the productivity for poultry houses is known as the speed to weight factor, or the time it takes for the poultry to reach the target weight.

Controlling body temperature, or thermoregulation, varies considerably between species of animals, sometimes identified as "warm-blooded". Young poultry, or chicks for example, have very limited ability to control their own body temperature during the first weeks of development after hatching. To mitigate this problem, when poultry chicks are raised after hatching, the chicks are commonly housed in large structures with ventilation and heating apparatus which is designed to keep the interior at or near 90° F. and to minimize interior humidity. The youngest chicks are sometimes raised in groups, or broods, confined to circular areas in the house known as brooding rings, underneath radiant heat sources known as radiant brooders or pancake brooders.

Environmental humidity has several deleterious effects on the development and health of the chicks in poultry houses. When relative humidity increases, the evaporative capacity of the air decreases. As chicks get older, they are able to lower their body temperature by evaporative heat loss from their lungs. If the chicks overheat, they begin to pant to reduce their core body temperature if unable to do so, they expire from heat stress. Similarly, the floor of the poultry house, or litter, becomes soaked in detritus, including bird waste, which if not allowed to dry by evaporation also negatively affects poultry health. Bacterial growth in the wet litter is known to be the most common source of ammonia gas in poultry houses.

Ammonia gas in a poultry house has been demonstrated to negatively affect chick health and growth. Ventilation of the structure is the common means to reduce ammonia, but this also decreases temperature, which is problematic during cooler months and necessitates frequent use of heating sources and associated costly energy resources. Venting with fresh air is commonly accomplished at fixed intervals for a structure and supplemental heat is provided to account for the infusion of cold air. This process can cause unwanted fluctuations in temperature in the interior of the structure and does not provide any dynamic ability to control interior ammonia.

In the United States, poultry livestock are primarily farmed in the southeastern states, from eastern Texas to North Carolina. Farming is year round in all locations. Widely varying local weather is common throughout the southeast United States sudden changes in weather are common in the spring and fall. This further complicates environmental control of the poultry houses. As mentioned above, during winter months, cold air vented into houses often requires considerable increase in the interior heating for houses with associated fuel costs.

Modern poultry house ventilation systems typically use very large "tunnel fans" which are extremely noisy, causing additional stress and negative health impact on the chicks growing in the poultry house.

Heat, relative humidity, ammonia and noise are several of the factors that can negatively impact both the health and market worthiness of the poultry, as well as the speed to weight for the poultry, or productivity of the house.

Due to the complexity of controlling numerous inputs and monitoring of potentially numerous conditions of poultry house environments, historically the conditions have been controlled manually by the poultry farmer, with warning indicators of extreme conditions. Computerized or automatic control systems have been used with varying degrees of success for several years. Yet numerous unsolved problems remain, including the reduction of energy use for heating and more reliable and effective ways of maintaining a balance of various environmental factors to optimize the conditions for the livestock within the housing structure.

SUMMARY

Various aspects of the system and method disclosed herein, coined the Environmental Optimization System ("EOS"), address the problems of closed livestock structure environmental control and monitoring. Among these are the integration of an automatic dynamically controlled solar thermal collection device, dynamic control of the fan speed venting collected hot air from the collector into the house, dynamic control for ventilation of the structure, integration of the solar collector control with the house HVAC system. In addition, aggregated collection of sensor output from one or more livestock houses and housing locations into a cloud based data server system, cloud based real-time monitoring of sensor systems, livestock behavior sensors as input to the control system and predictive control of the environmental apparatus. The benefits of the disclosed system include the dynamic ability to adjust house ventilation while maintaining optimal temperature in the house obtaining ideal ammonia levels—which directly impacts the speed to weight factor measure of house productivity.

Various embodiments for the EOS system include a variety of sensor systems, which depend on the needs of a particular installation. Sensor systems may include exterior ambient temperature sensors, structure interior temperature sensors, thermal collection space temperature sensors, ventilation inlet and outlet temperature sensors, ammonia concentration sensors, $CO_2$ concentration sensors, relative humidity sensors, ultrasonic and infrared motion sensors, sound level sensors, microphones, video cameras, thermal imaging cameras and sunlight sensors.

In certain embodiments, solar thermal collection panels affixed to either the roofs or sun facing exterior walls of the livestock structures collect thermal energy in enclosed exterior spaces abutting the structure. The panel enclosures are controlled by the EOS system to either vent collected hot air into the structure interior, or opening vents on the top and bottom of the panel enclosure which allows unheated air to vent into the house, or to act as a thermal barrier from incident sunlight, by not trapping heat against the house. In various embodiments, the collection panel's orientation to the incident angle of the sun may be automatically adjusted by the EOS system. Temperature, humidity, sunlight and other sensors located on the exterior of the solar collection unit, in the interior of the solar unit at the house inlet vent and in the interior of the poultry house (including ammonia concentration sensors) are used by the EOS to control the solar collection air circulation, panel orientation, vent and vent fan controls. In various embodiments, the solar collection component utilizes Transpired Solar Collector ("TSC") panels for efficient thermal collection.

In certain embodiments, livestock behavior sensors may be integrated into the EOS system assist in measuring environment impact on the housed livestock and dynamically control the system to optimize healthy and productive conditions. Behavior may be monitored and measured by motion sensors, live video feeds, thermal imaging cameras and digital image analysis for motion and livestock patterns known to indicate healthy or unhealthy conditions. Digital analysis of thermal imaging can be used to determine thermal distribution in the house as well as the body heat and distribution of livestock in the house. Sound level sensors or microphones coupled with digital signal analysis can be used to measure livestock distress, healthy livestock (poultry chicks making soft "cheeping" sound) and stressful background noises. In certain embodiments large numbers of spatially deployed sensors throughout a facility may be implemented using a technology such as Bluetooth LE.

In certain embodiments, sensor readings from the EOS, including sensors related to measuring livestock behavior and live video, are sent from the poultry house to the Internet "cloud" for aggregation into a database used for tracking the system performance. The EOS database may be hosted in the cloud or on a dedicated server. In various embodiments sensors are networked together for a given facility by wireless data transmission such as Wifi or Zigbee. In various embodiments, data from multiple sensors is taken as inputs for a controller which utilizes an optimization strategy to maintain ideal environmental conditions, which is measured by both the environment metrics known to be optimal and by the actual livestock behavior and growth metrics. The outputs of the controller include the controlled vents and fans. Examples of optimization strategies in various embodiments includes fuzzy control, fuzzy logic, decomposition into 2×2 control arrays, genetic algorithms, and multivariate regression. In other embodiments, the system is operated based on empirically derived and manually set control points, for example where optimization is performed manually by the operator of the system based upon observations of the particular livestock being raised demonstrating the effect of the given environmental conditions.

In certain embodiments, data from the EOS system hosted in an Internet cloud system is available for remote monitoring. The EOS data is utilized to perform the optimization control which is sent back from the system to the poultry house ventilation and fan controllers as described above. In various embodiments, the EOS performs analytics on the aggregated data from one or more poultry houses, which analytic information is available to system operators and livestock production staff. Such information may be presented as data log files for the sensors, or graphically and may include one or more environmental, behavior, or production metrics.

In various embodiments, weather prediction data for poultry house locations available from Internet sources is incorporated into the EOS system. This will aid in the predictive control of the poultry house systems to reduce the effect of rapidly changing ambient weather conditions on the interior house environment.

In certain embodiments, the EOS system utilizes machine learning to improve predictive environment control and operation control of the poultry house systems.

In various embodiments, the transpired solar collector ("TSC") enclosure is utilized as a solar shade when the exterior ambient temperature is high, such that air is vented through the enclosure and the external wall of the house remains relatively cool.

In various embodiments, hot air from the enclosure may be vented into a thermal storage volume, such as an attic of the house during daytime, and then pumped into the house at nighttime to save heating costs at night. This process is controlled by the EOS.

DETAILED DESCRIPTION

In an exemplary embodiment, an Environmental Optimization System ("EOS") provides a system for the intelligent control and monitoring of a poultry house environment and livestock through the utilization of a solar thermal collection system, a variety of environmental sensors, apparatus for controlling the thermal collection and existing interior heating/air conditioning/ventilation ("HVAC") systems and Internet or "cloud" based intelligent control and monitoring capability of the system.

Other exemplary applications include embodiments in which EOS is utilized for residential and greenhouse or other housed agriculture environmental control. Various residential and agricultural embodiments include solar thermal collection components.

Figure 1:
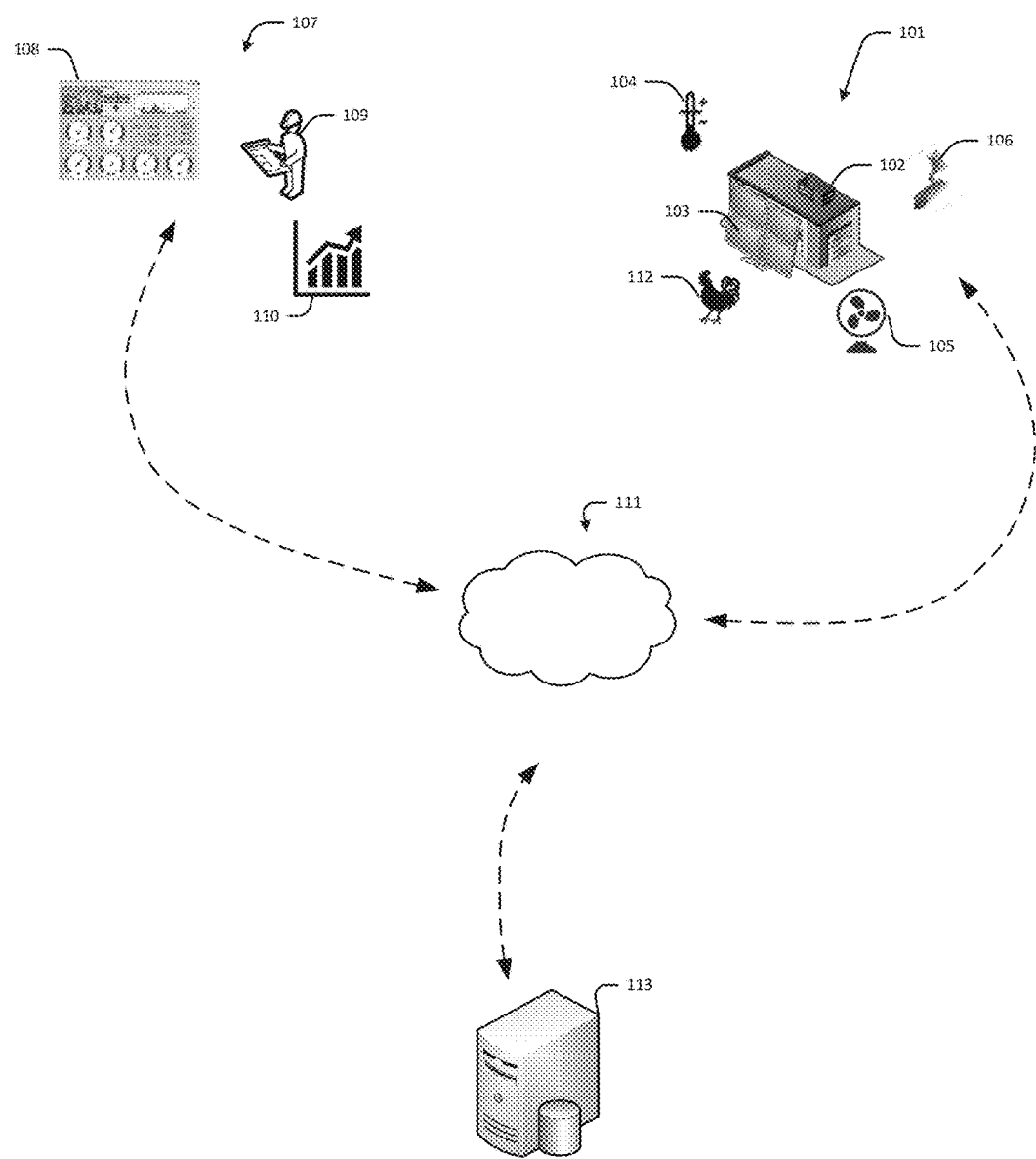
FIG. 1 depicts an overview of an exemplary EOS system.

FIG. 1 shows an overview of an exemplary embodiment of an EOS system. In this embodiment, the controlled environment is the interior of a livestock structure 102, specifically one for raising poultry chicks 112. The poultry housing location 101 includes sensor systems 104, a dynamic solar thermal collector 103, thermal collector ventilation fans 105 and video monitors 106.

The EOS in this embodiment includes capabilities for remote monitoring 107 of the system sensors and video 108 by the facility operator 109, as well as analytics of the environmental conditions, livestock behavior production output 110. Data from the livestock environment 101 by uplink to the Internet (cloud) 111. Control, access, storage analytics may be hosted in the cloud 111 or in an offsite server system 113.

In certain embodiments the solar thermal collector 103 is a fabricated transpired solar collector ("TSC") with EOS control of thermal ventilation and the angle of incidence of the solar panel to the sun. The incident angle may be adjusting the elevation angle of a normal to the solar collection surface by vertical tilt, or by adjusting the radial angle of incidence by rotational adjustments of the solar facing surface.

Figure 2:
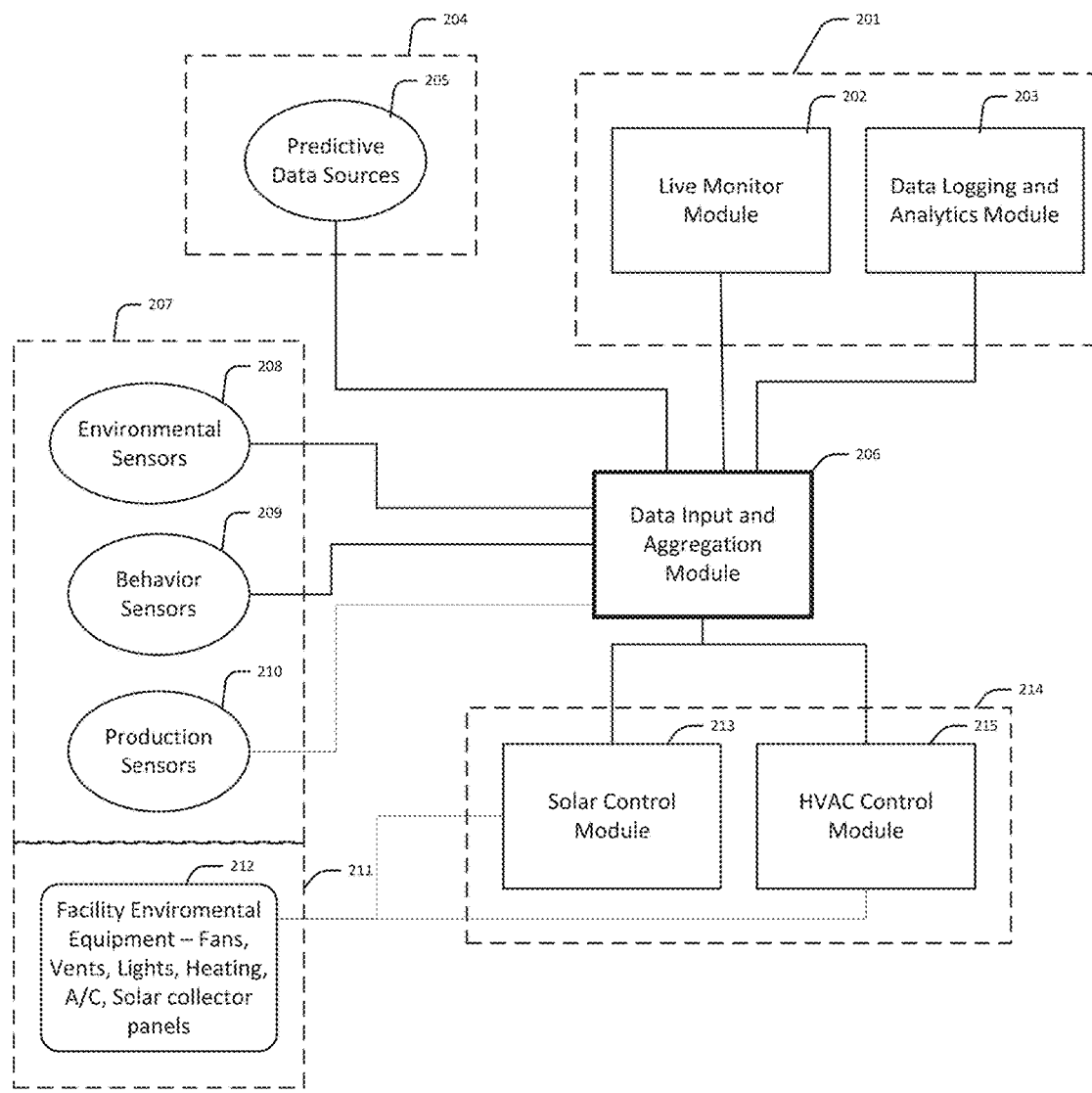
FIG. 2 is a block diagram showing the components of an exemplary EOS system.

An embodiment of EOS control and data monitoring modules is shown in FIG. 2. Data source include on-site sensor systems 207 cloud based information 204, including predictive data 205, such as weather prediction information from an Internet source such as weather.com. On-site sensor systems 207 include environmental sensors 208 such as interior and ambient exterior temperature, interior $CO_2$ concentration, ammonia concentration, relative humidity sound level. Livestock behavior sensors 209 include motion detectors, video, thermal imaging, audio filtered for appropriate livestock frequencies, digital video analysis of livestock patterns, motion detection thermal distribution. On-site production sensors 210 in various embodiments may include sensors measuring livestock feed and water consumption, livestock weight and the speed to weight, or days of production to desired production weight.

The EOS system in various embodiments includes various data collection and processing aggregation modules 201 206 214. The primary data collection module 206 receives onsite 207 and offsite inputs 204 and sends output as the system directs, to the control modules 214 and the data monitor, logging and analytics modules 201. Data monitoring includes the live video feed, which is provided through the cloud 202 along with other logged 203 and live sensor data. Controller outputs are sent from the primary module to the solar collection control module the facility HVAC control module. The EOS system operates in various embodiments by an integrated control of the solar thermal collection and ventilation and HVAC apparatus, including either forced air or radiant heaters 212, which are on-site at the poultry house livestock facility 211.

Figure 3:
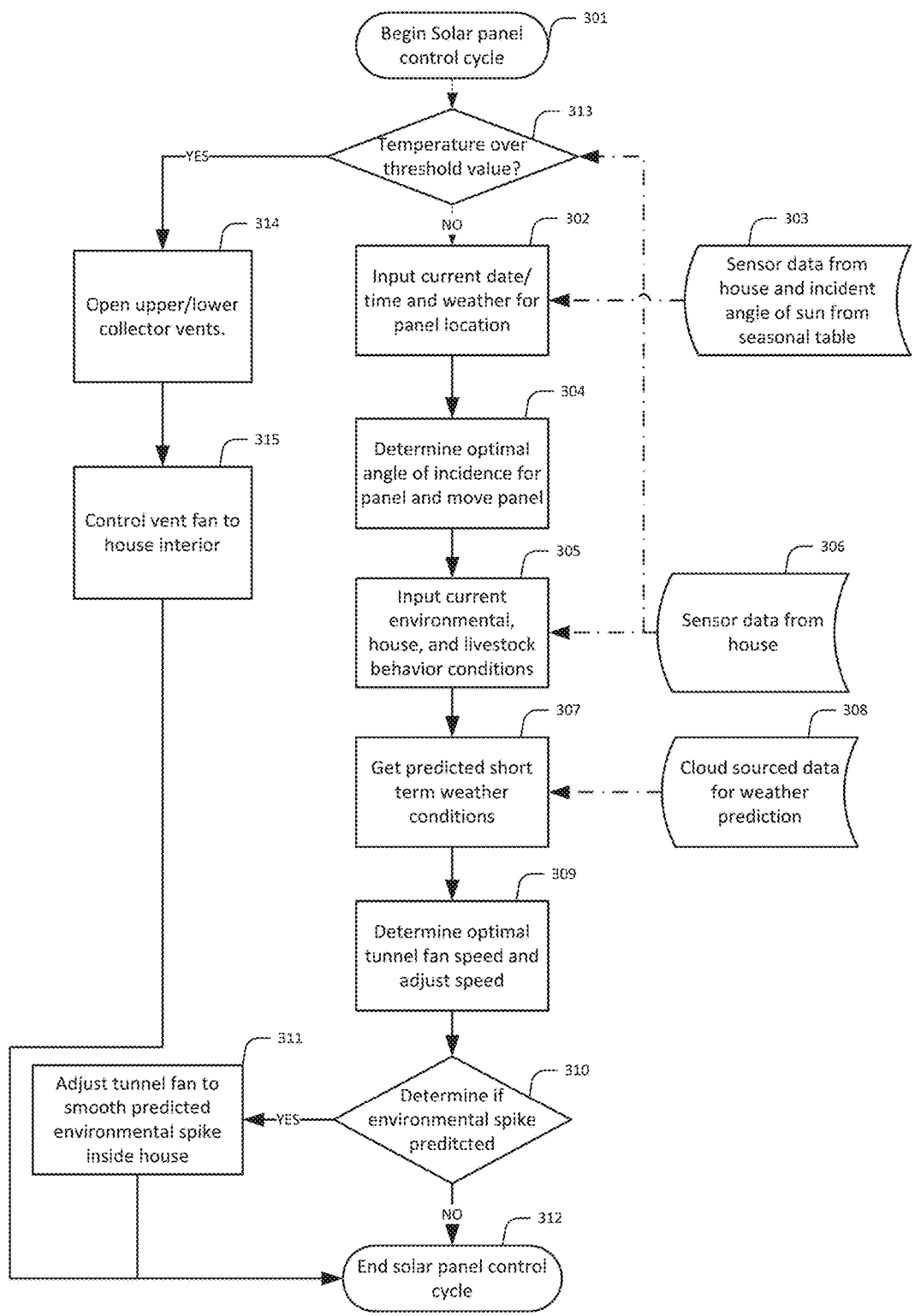
FIG. 3 is a flow chart showing an embodiment of the operation flow for solar collector panel system control.

In various embodiments, a solar thermal collection apparatus is used as a controlled component by the EOS. An embodiment of solar thermal collection control operation is shown by flow chart in FIG. 3. In the shown embodiment, the collector control is initiated 301, before the control system receives various sensors. In certain embodiments, the solar collector is used as either a thermal insulator during high ambient temperature conditions, or to vent unheated fresh air into the house. The EOS controls this by opening collection system vents 314, on the top and bottom of the collector, when the ambient exterior temperature is above a threshold value 313. When indicated by the EOS to vent fresh air into the house (such as during high ammonia detection), air bypassing the solar collection panel is vented into the house 315. In certain embodiments, the collection panel may be moved or adjusted 304 according to the incident angle of the sun according to date (season), time of day 302 and the location of the house (latitude/longitude) according to data from look-up tables available through the cloud 303. After optimizing the incident angle 304, sensor information 306 is received by the system 305, including in various embodiments, $CO_2$ concentration, ammonia concentration, interior and exterior temperature, sunlight, relative humidity, interior sound level, thermal distribution livestock distribution and movement. In various embodiments, weather prediction data 308 for the house location is provided from cloud based sources, particularly short term temperature predictions 307. In various embodiments, a fan in certain embodiments a tunnel fan, is used intermittently and a varying speeds, according to the controller 309 to raise house interior temperature by venting the thermal collection of fresh air into the interior of the house. If the system receives input indicating an impending spike drop in ambient temperature 310, the system may adjust or initiate an early start for the vent fan 311. The control cycle then completes 312 and is run periodically according to EOS operation.

Figure 3A:
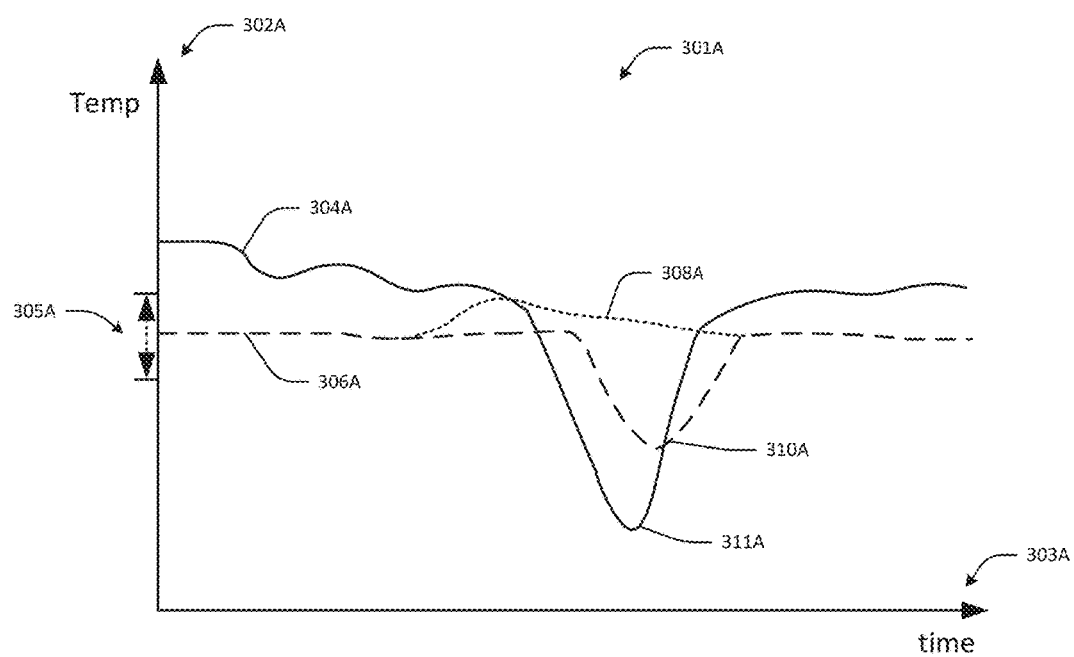
FIG. 3A is a chart showing an example use of predictive control for interior poultry house environment.

FIG. 3A shows a time based 303A graph 301A of the interior and exterior house temperatures 302A and the effectiveness of EOS predictive control anticipating sudden temperature drops. In this graph, the solid line 304A represents exterior ambient temperature. If the EOS receives prediction data that the ambient temperature is going to have a sudden drop 311A during sunlight hours to a temperature below the ideal range 305A, the collector controller closes its upper/lower vents (shown in FIG. 3B) and begins thermal collection early to vent into the house interior. Thus, instead of reacting late to the temperature sudden drop 310A, the EOS uses early thermal collection to keep the interior temperature within the ideal range 308A. In various embodiments, the EOS may make other dynamic predictive adjustments to environment systems to account for predicted changes in relative humidity, predicted severe inclement weather, or predictive information from nearby monitored EOS based facilities.

Figure 3B:
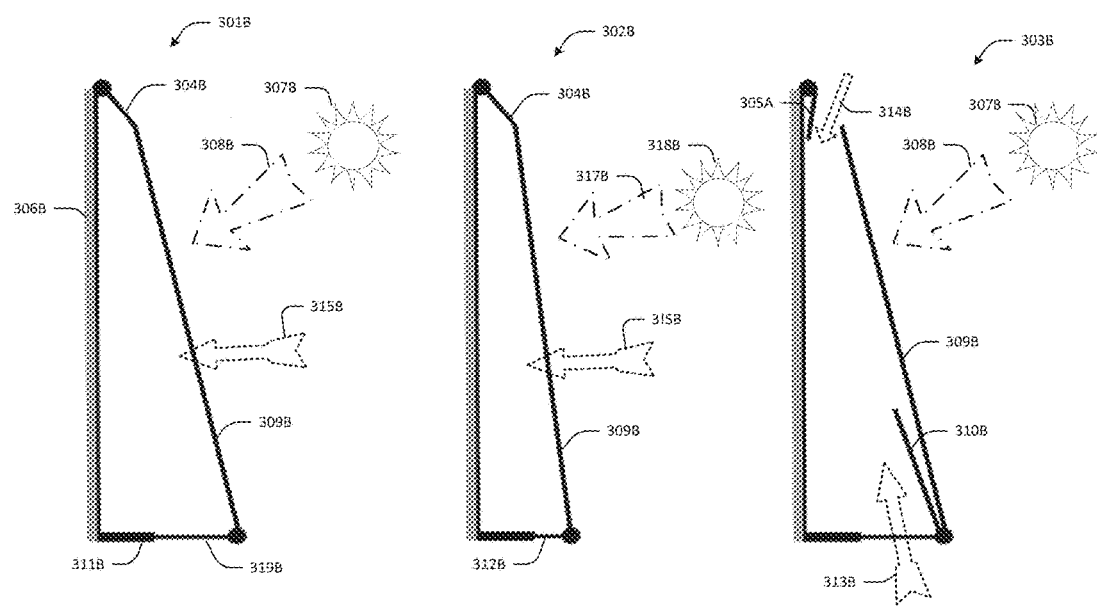
FIG. 3B shows 3 diagrams which depict configurations of the solar collector during various modes of operation.

FIG. 3B shows 3 different configurations demonstrating operation of the solar collector component in various embodiments. During summer use with relatively low ambient temperatures 301B, when the sun 307B is at a higher angle on incidence to the panel 308B, the bottom component of the panel structure 311B extends away from the house structure. During this operation mode, the upper 304B and lower 319B panel vents remain closed fresh air passes through 315B the transpired solar collector 309B. A foam insulator and mount 306B is used for thermal isolation between the panel and house exterior wall. During winter operation of the panel 302B, the sun 318B is at a lower angle of incidence 317B the bottom component of the panel structure 312B retracts towards the house structure. During summer operation of the panel with high relative ambient temperature 303B, the upper 305B and lower 310B panel structure vents are opened, allowing fresh air in the upper vent 314B and lower vent 313B to bypass the solar collector, reducing the temperature of air vented into the structure. In various embodiments the EOS is used to adjust vent apparatus for balancing thermal control and measured ammonia concentration in the house. In various embodiments, the panel vents may be hinged vents, butterfly vents, or electric motor controlled vents, among other available options.

Figure 4:
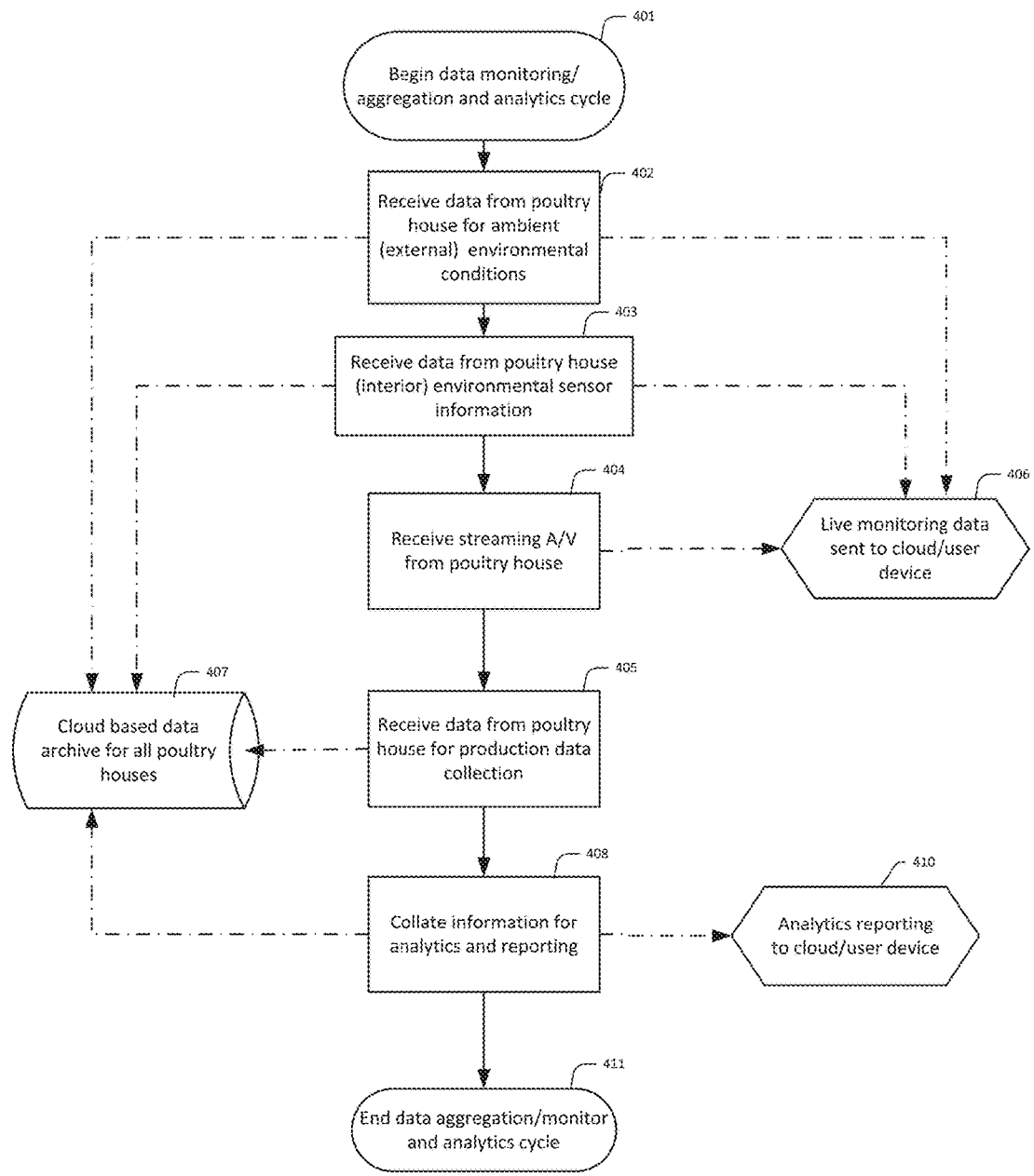
FIG. 4 is a flow chart showing an embodiment of the operation of data aggregation from poultry houses and the performance of analytics for adjusting environmental control.

In various embodiments, data collection, monitoring analytics provide information relevant to the EOS controller and to system operators. In FIG. 4, this process is depicted by a flow chart. After data collection initiation 401, sensor information is received from house exterior sensors 402, which is sent to the EOS monitor user interface 406 to the EOS data archive 407. Similarly, interior sensor data received by the EOS 403 is sent to the archive component 407 and monitor user interface 406. Streaming (live) audio and video received by the system is uploaded to EOS 404 and available for the monitor user interface 406. Productivity data for the livestock is provided by sensors to the EOS 405 sent to the archive 407 for system aggregation 408. In various embodiments, the EOS computes analytics, for example trend analysis 408, which is sent to the user interface as requested 410. The collection cycle is completed 411 and periodically performed according to the EOS. In various embodiments, the EOS provides daily updates for operators to monitor the improvement in a house's speed to weight, a key measure of productivity.

Figure 5:
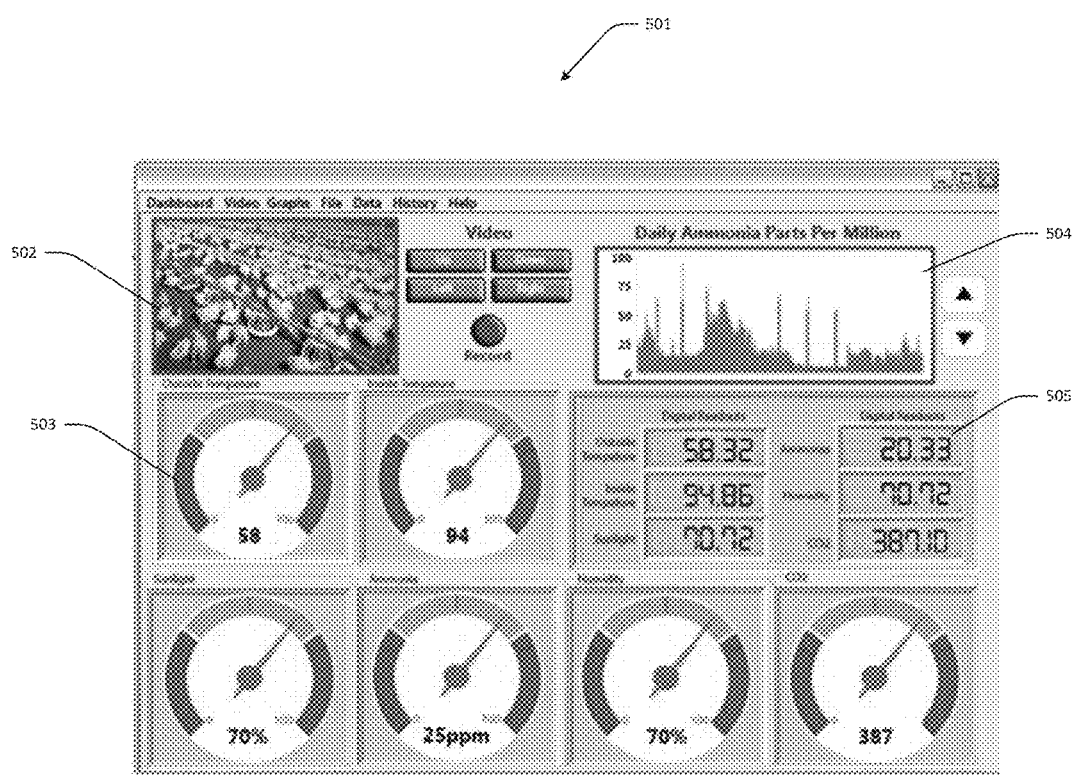
FIG. 5 shows an embodiment of a remote EOS monitor primary user interface.

FIG. 5 shows an exemplary embodiment user interface 501 for EOS monitoring. Various embodiments contain different layouts and sensor information in the interface. In the shown embodiment, streaming video from the house 502 is shown along with an array of sensor gauges 503, digital gauges 505 historical (trend) data for relevant sensor information 504.

Figure 6:
FIG. 6 shows an embodiment of a remote EOS video feed user interface.

FIG. 6 shows an exemplary embodiment of the user interface 601 for EOS streaming video 602 from the house interior. Also available through the interface in certain embodiments is an interface for controlling the video feed 603 and a gauge showing livestock motion.

Figure 7:
FIG. 7 shows is an embodiment of a remote EOS analytics monitor for environment sensors.

FIG. 7 shows an exemplary embodiment of the user interface 701 for EOS sensor historical data. In the shown embodiment, (time based) historical data is shown for sensor inputs such as external (ambient) temperature 702. The user interface also includes capabilities for users to show other analytics, to modify the data trends shown 704 and to manipulate the chart size 703.

Figure 8:
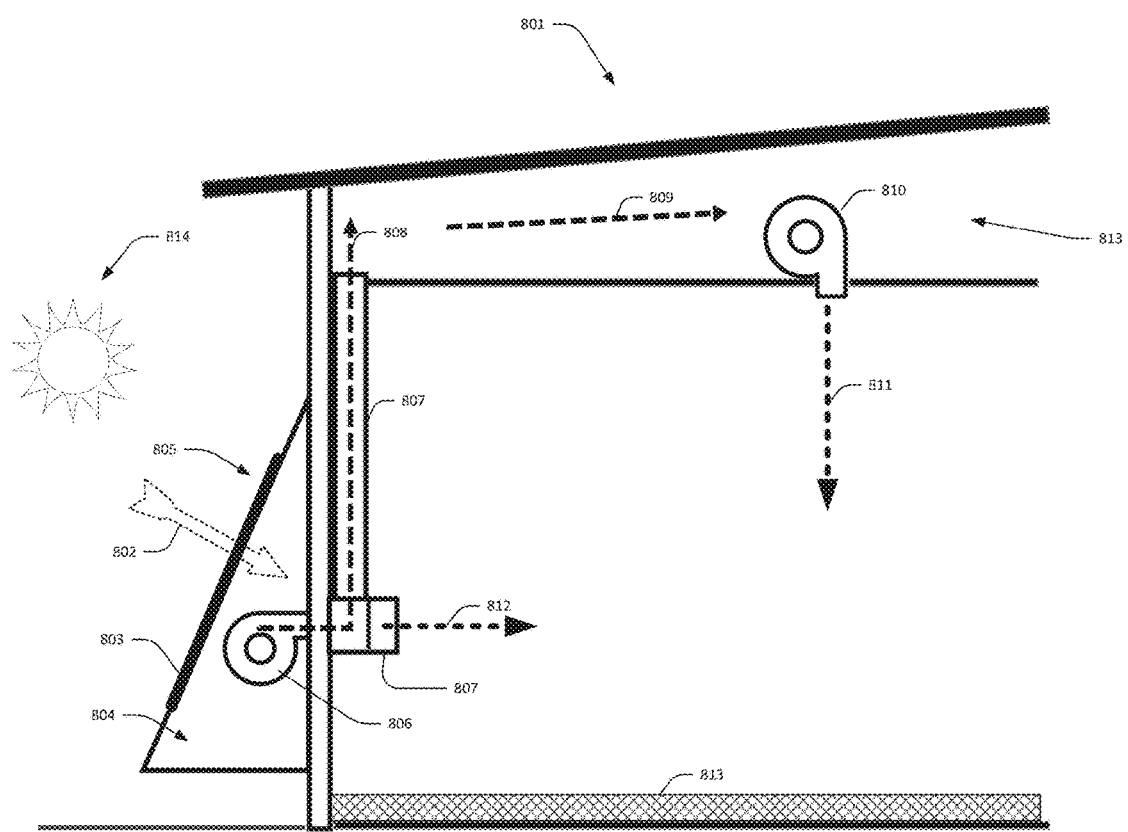
FIG. 8 shows a diagram of an embodiment utilizing a thermal storage volume.

FIG. 8 shows a diagram of an embodiment of the system which includes a thermal or heat storage volume component. The poultry or residential house is shown 801 with the thermal storage volume in the "attic" 813 of the house 801. The components shown here include the solar collection enclosure 805 which collects solar 814 thermal energy which is collected by radiation 802 against the transpired solar collector 803. When unvented and in direct sunlight, experimental results have shown the enclosure internal air 804 temperature may rise over 80° F. above the ambient air temperature. During certain weather conditions and times of day, the heat accumulated in the collector enclosure may not be needed to heat the house interior. In the shown embodiment, this heat may be vented by a forced air blower fan 806 and directionally controlled 807 by a duct 804 into 808 a storage volume 813 809, which in this embodiment is the attic of the house. During optimal conditions determined by the EOS control system, the stored heat is vented 811 to the house interior by a forced air blower 810.

In various embodiments, during certain times the house is vacant of poultry and the detritus from bottom of the house 813 is either cleaned out manually, or dried out during a clean out period. Experimental results show that under certain conditions, sun heated air in the solar enclosures may be 80° F. or more above the ambient air and with an 18% or more reduction in the ambient humidity of the outside air pulled through the solar collector. Given the amount of available heat, the EOS may be utilized in certain embodiments to raise house interior temperatures to the maximum temperature needed without supplemental fuel usage. Empirical analysis indicates a potential for a 20% to 50% or more reduction in clean out time of the house utilizing EOS controlled TSC solar enclosures depending on the time of the year and ambient temperature conditions.

Figure 9:
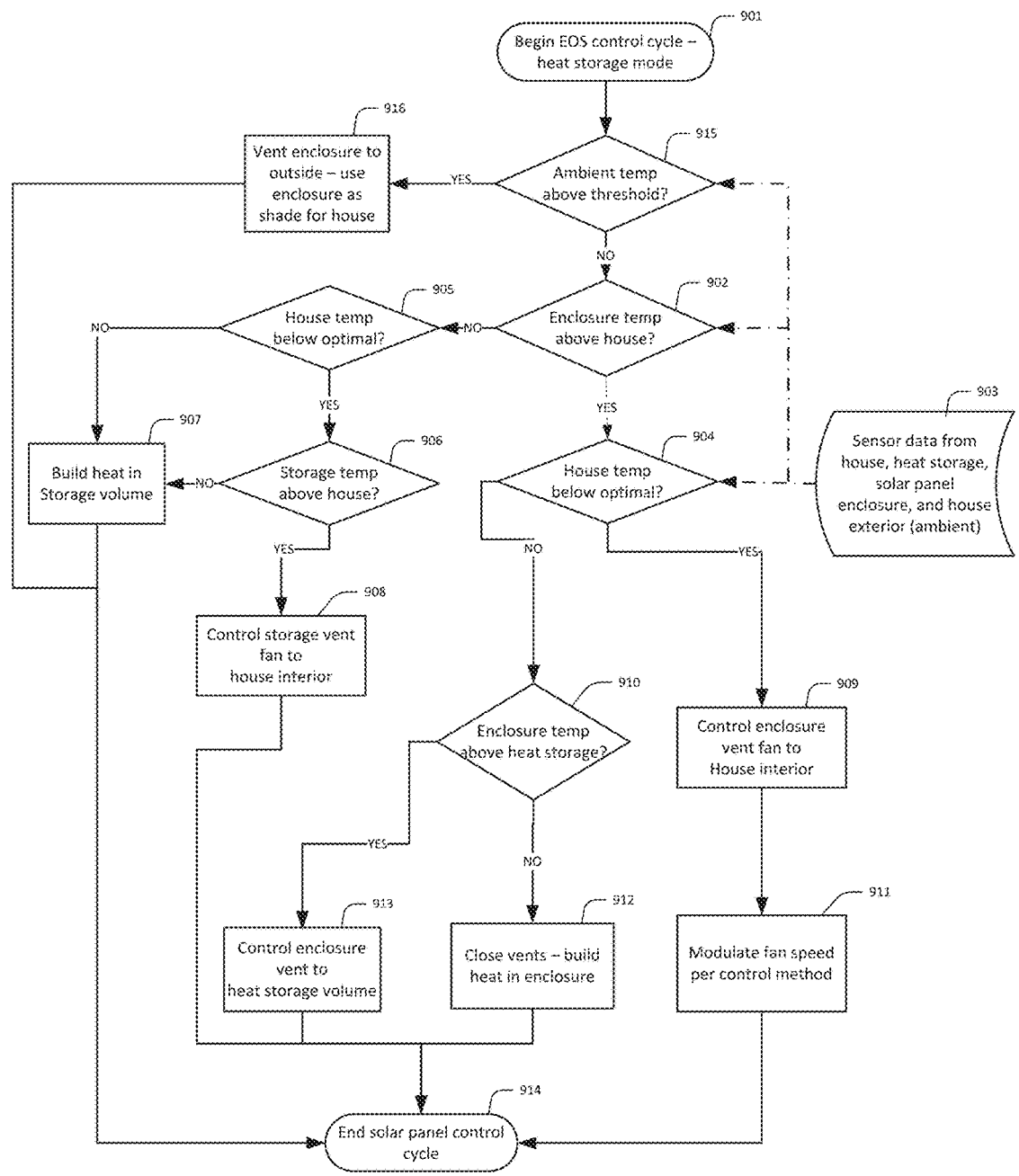
FIG. 9 is a flow chart showing the operation of enclosure venting and heat storage processes controlled by EOS.

FIG. 9 shows a flow chart of the operation and control of an embodiment which includes a heat storage volume. Control of the system in this embodiment operates as a HVAC cycle 901 with environmental sensors 903 inputs and controlled vents and fans. During very warm weather conditions, the interior of the house may significantly exceed optimal conditions. During such conditions 915 in various embodiments, the EOS may be used to operate the solar collector as an exterior shade or solar insulator, by opening upper and lower vents on the collector 916 using the fans to push the heated air out of the solar collectors and into the outside environment. During cooler days, the enclosure is used to heat the house interior during conditions when the enclosure temperature is above the house interior 902 until the house reaches the optimal temperature 904. Under these conditions, the enclosure is vented to the interior of the house by a forced air fan 909, which is speed modulated 911 during the HVAC cycle to minimize electricity used by the fan and reduce the noise output.

Once the house optimal temperature is reached under these conditions 904-910 and according to the heat storage temperature 910 the enclosure heat may be diverted into the storage volume 913. Otherwise, the enclosure vents are closed and fan remains off while heat builds up in the enclosure 912.

When the exterior temperature drops at night and no heat is available from the enclosure 902-905, the stored heat (if hot enough 906) may be used to heat the house interior 908. Otherwise, residual enclosure heat may be used to build heat in storage, performing in some embodiments a thermal insulation effect for the interior.

For various embodiments the system components may be installed in combination with an existing structure HVAC system to minimize energy or fuel necessary to maintain the structure interior environment at optimal environmental conditions.

For various embodiments the system components are not directly integrated with the HVAC system, but the house ventilation cycle is modified according to experimental results of the EOS system. For example, a common current configuration for poultry housing is for the large high volume tunnel fans to be programmed for periodic operation to remove ammonia from the house interior. A typical ventilation system may operate the tunnel(s) fan at full speed for perhaps 5 seconds every minute. In various embodiments, without directly integrating the EOS system with the current housing ventilation system, experimental results will demonstrate the amount of ammonia reduction provided by the EOS system, and the ventilation system may be reprogrammed or adjusted to reduce the ventilation tunnel fan operation for example to 5 seconds every 5 minutes. Since tunnel fan operation is extremely noisy and causes near windy conditions inside the house, the operation of the fans is detrimental to the health of the poultry. Hence minimizing the operation of the fans by the use of various embodiments of the EOS system improves the poultry health, reduces ammonia gasses in the interior environment, and decreases supplemental energy usage.

For various embodiments the system maintains a database of optimal structure interior temperatures and conditions with associated dates and times according to empirically determined optimal conditions during the growth life cycle of the livestock in the structure. For various embodiments the system may be manually reset to restart the growth cycle environment control, or may automatically reset according to sensor input indicating that a new growth cycle of livestock in the structure has begun.

For various embodiments, the solar collectors components are designed for modular construction and may be configured with end collector units and center collector units such that each system has end units and at least one center unit, each unit having its own ventilation, fan, and sensor components based on the system needs and are electronically and electronically interconnected.

The implications of the present invention's numerous potential configurations and embodiments are far reaching. Other embodiment include any livestock housing, grow houses for tropical plants, germination, or out of season cultivation, or as an energy saving system for human inhabited structures. The economic savings provided by the use of optimized thermal collection are widely applicable and available by only small changes to presented embodiments.

In the various described and other embodiments, use of a sustainable energy source provides significant savings in energy, including the energy usage per production pound of livestock. Additionally, various embodiments reduce polluting emissions from the facility, including $CO_2$ and ammonia.

Although the invention has been described in terms of the preferred and exemplary embodiments, one skilled in the art will recognize many embodiments not mentioned here by the discussion and drawing of the invention. Interpretation should not be limited to those embodiments specifically described in this specification.

I claim:

1. A system for controlling the heating and ventilation of a poultry livestock structure comprising:
    a broiler poultry livestock structure;
    a control unit comprising a solor panel controller and an HVAC controller;
    at least one interior temperature sensor located in an interior of the broiler poultry livestock structure;
    at least one exterior temperature sensor located in an exterior of the broiler poultry livestock structure;
    at least one solar thermal collector sized according to a size of the broiler poultry livestock structure, wherein the broiler poultry livestock structure houses broiler poultry livestock, wherein the at least one solar thermal collector comprises a transpired solar collector and an enclosed collection chamber;
    at least one controllable vent and at least one controllable fan between the at least one solar thermal collector and the interior of the broiler poultry livestock structure, wherein the operation of the at least one controllable fan and the at least one controllable vent are adjustable;
    wherein during periods when a measured exterior ambient temperature is above a threshold value, the at least one solar thermal collector functions as an exterior insulator to shade the broiler poultry livestock structure from direct sunlight by changing the incident angle of the transpired solar collector and by opening upper and lower vents on the solar thermal collector and using the at least one controllable fan to push the heated air out of the solar thermal collector such that fresh air is vented into the enclosed collection chamber and bypassed the transpired solar collector;
    wherein the control unit optimizes environmental conditions in the interior of the broiler poultry livestock structure by controlling the amount of the heated air collected by the at least one solar thermal collector which is vented into the interior of the broiler poultry livestock structure to provide dynamic adjustments of the interior temperature.

2. The system as in claim 1 further comprising:
    a plurality of audio sensors installed within the broiler poultry livestock structure.

3. The system as in claim 1 further comprising:
    a plurality of audio sensors installed within the broiler poultry livestock structure;
    wherein a plurality of audio sensor data captured within the broiler poultry livestock structure is communicated to a computing device;
    wherein the computing device utilizes digital signal processing to determine stress conditions of the broiler poultry livestock housed in the broiler poultry livestock structure based on known or calibrated broiler poultry livestock stress correlated audio characteristics;
    wherein the operation of the at least one controllable fan and the at least one controllable vent are adjusted according to measured broiler poultry stress conditions.

4. The system as in claim 1 further comprising: at least one ammonia sensor.

5. The system as in claim 1 further comprising: at least one video camera.

6. The system as in claim 1 further comprising: a means for sensing the behavior of the broiler poultry livestock housed in the broiler poultry livestock structure.

7. The system as in claim 1 further comprising: a central server hosting data received from one or more sensor inputs from the broiler poultry livestock structure.

8. The system as in claim 1 further comprising: a central server hosting data received from one or more sensor inputs from the broiler poultry livestock structure and data received from an environmental control from the broiler poultry livestock structure.

9. The system as in claim 1 further comprising:
    a central server hosting data received from one or more sensor inputs from the broiler poultry livestock structure and data received from an environmental control from the broiler poultry livestock structure,
    wherein said data received from the one or more sensor inputs and said data received from the environmental control is aggregated over time.

10. The system as in claim 1 further comprising:
    a central server hosting data received from one or more sensor inputs from the broiler poultry livestock structure and data received from an environmental control from the broiler poultry livestock structure,
    wherein said data received from the one or more sensor inputs and said data received from the environmental control of the broiler poultry livestock structure is aggregated over time and wherein said environmental control may be operated by a user remote system.

11. The system as in claim 1 further comprising:
    a thermal storage volume;
    wherein the heated air collected by the at least one solar thermal collector is directed from the at least one solar thermal collector to the thermal storage volume and redirected at a later time to the broiler poultry livestock structure by a system controller.

12. A method for controlling the heating and ventilation of a poultry livestock structure comprising:
    sensing an exterior structure temperature, an interior structure temperature, of the broiler poultry livestock structure and an interior temperature of a solar thermal collector attached to the broiler poultry livestock structure with sensors, wherein the solar thermal collector comprises a transpired solar collector and an enclosed collection chamber;

controlling one or more vents and one or more fans for regulating a movement of air between the solar thermal collector and the interior of the broiler poultry livestock structure with an HVAC controller;

controlling one or more vents and one or more fans for regulating a movement of air between the interior of the broiler poultry livestock structure and exterior of the broiler poultry livestock structure with the HVAC controller;

optimizing a control operation of the one or more vents and the one or more fans based upon initial system settings which are modified based upon feedback from the sensors;

adjusting the operation of the one or more fans and the one or more vents with the HVAC controller;

wherein during periods when a measured exterior ambient temperature is above a threshold value, the at least one solar thermal collector functions as an exterior insulator to shade the broiler poultry livestock structure from direct sunlight by changing the incident angle of the transpired solar collector with a solor panel controller and by opening upper and lower vents on the solar thermal collector and using the at least one controllable fan to push the heated air out of the solar thermal collector such that fresh air is vented into the enclosed collection chamber and bypasses the transpired solar collector.

13. The method as in claim 12:

wherein during periods when livestock is absent from the broiler poultry livestock structure the accumulated detritus on the floor of the broiler poultry livestock structure is dried by heated air vented from the solar thermal collector to the interior of the broiler poultry livestock structure.

14. The method as in claim 12 further comprising:

communicating audio sensor data captured within the broiler poultry livestock structure to a computing device.

15. The method as in claim 12 further comprising:

communicating audio sensor data captured within the broiler poultry livestock structure to a computing device;

wherein a computing device utilizes digital signal processing of the audio sensor data to determine stress conditions of the broiler poultry livestock housed in the broiler poultry livestock structure based on known or calibrated broiler poultry livestock stress correlated audio characteristics.

16. The method as in claim 12 further comprising:

aggregating data received from the sensors in the broiler poultry livestock structure over time;

providing remote access for users to access data received from the sensors in the broiler poultry livestock structure.

17. The method as in claim 12 further comprising:

aggregating data received from the sensors in the broiler poultry livestock structure over time;

providing remote access for users to access data received from the sensors in the broiler poultry livestock structure;

providing remote control access for users to control the one or more fans and the one or more vents of the broiler poultry livestock structure;

optimizing an environmental control of the broiler poultry livestock structure by the adjustment of the one or more fans and the one or more vents operation based on feedback of the aggregated data received from the sensors.

18. The method as in claim 12 further comprising:

receiving weather prediction information from an online source about the location of the broiler poultry livestock structure by a central server;

adjusting the operation of the one or more fans and the one or more vents to predicatively modify the environmental conditions of the broiler poultry livestock structure in advance of predicted weather events.

* * * * *